(12) United States Patent
Trush et al.

(10) Patent No.: US 8,380,392 B2
(45) Date of Patent: Feb. 19, 2013

(54) METHOD TO ENSURE SAFETY INTEGRITY OF A MICROPROCESSOR OVER A DISTRIBUTED NETWORK FOR AUTOMOTIVE APPLICATIONS

(75) Inventors: Christopher J. Trush, Novi, MI (US); Padma Sundaram, West Bloomfield, MI (US)

(73) Assignee: GM Global Technology Operations LLC

(*) Notice: Subject to any disclaimer, the term of this patent is extended or adjusted under 35 U.S.C. 154(b) by 193 days.

(21) Appl. No.: 12/832,310

(22) Filed: Jul. 8, 2010

(65) Prior Publication Data

US 2011/0257833 A1  Oct. 20, 2011

Related U.S. Application Data

(60) Provisional application No. 61/325,588, filed on Apr. 19, 2010.

(51) Int. Cl.
*G06F 17/00* (2006.01)

(52) U.S. Cl. .......................................................... 701/36

(58) Field of Classification Search .................... 701/36, 701/37, 38
See application file for complete search history.

(56) References Cited

U.S. PATENT DOCUMENTS

| | | | | |
|---|---|---|---|---|
| 4,885,676 A | * | 12/1989 | Zweighaft | 700/73 |
| 5,452,443 A | * | 9/1995 | Oyamada et al. | 714/10 |
| 6,424,900 B2 | * | 7/2002 | Murray et al. | 701/48 |
| 7,424,641 B2 | * | 9/2008 | Sundaram et al. | 714/11 |
| 7,558,661 B2 | * | 7/2009 | Sundaram et al. | 701/70 |
| 7,774,074 B2 | * | 8/2010 | Davlin et al. | 700/3 |
| 2007/0005203 A1 | * | 1/2007 | Sundaram et al. | 701/33 |

FOREIGN PATENT DOCUMENTS

| | | |
|---|---|---|
| DE | 10331873 (A1) | 2/2005 |
| DE | 102004022624 (A1) | 12/2005 |

OTHER PUBLICATIONS

Lala, J.H.; Harper, R.E.; Architectural principles for safety-critical real-time applications.*
Office Action dated Oct. 15, 2012 from the German Patent Office for German Patent Application No. DE102011016514.2; 5 Pages.

* cited by examiner

*Primary Examiner* — Thomas Tarcza
*Assistant Examiner* — Alex C Dunn

(57) ABSTRACT

A processor integrity system in a vehicle includes m main processor modules that control at least m respective functions of the vehicle, where m is n integer greater than or equal to one. A monitoring processor module controls at least one function of the vehicle, communicates with the m main processor modules over a distributed vehicle network, selectively transmits a query to at least one of the m main processor modules over the distributed vehicle network, receives an answer from the at least one of the m main processor modules over the distributed vehicle network, that verifies integrity of the at least one of the m main processor modules based on the answer.

17 Claims, 4 Drawing Sheets

US 8,380,392 B2

METHOD TO ENSURE SAFETY INTEGRITY OF A MICROPROCESSOR OVER A DISTRIBUTED NETWORK FOR AUTOMOTIVE APPLICATIONS

CROSS-REFERENCE TO RELATED APPLICATIONS

This application claims the benefit of U.S. Provisional Application No. 61/325,588, filed on Apr. 19, 2010. The disclosure of the above application is incorporated herein by reference in its entirety.

FIELD

The present disclosure relates to ensuring microprocessor safety integrity in automotive applications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An automotive electronic control system for a vehicle controls vehicle functions including, but not limited to, vehicle propulsion, braking, steering, and transmission operation. One or more main microprocessors execute software and/or perform calculations associated with the control of these vehicle functions. As such, vehicle performance depends on the integrity of the main microprocessor. The vehicle may implement diagnostics to verify the integrity of the main microprocessor.

For example, the vehicle may include a dedicated secondary microprocessor that monitors the main microprocessor. The secondary microprocessor may verify the integrity of the main microprocessor by, for example, exchanging seeds and keys with the main processor.

SUMMARY

A processor integrity system in a vehicle includes m main processor modules that control at least m respective functions of the vehicle, where m is an integer greater than or equal to one. A monitoring processor module controls at least one function of the vehicle, communicates with the m main processor modules over a distributed vehicle network, selectively transmits a query to at least one of the m main processor modules over the distributed vehicle network, receives an answer from the at least one of the m main processor modules over the distributed vehicle network, that verifies integrity of the at least one of the m main processor modules based on the answer.

In other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
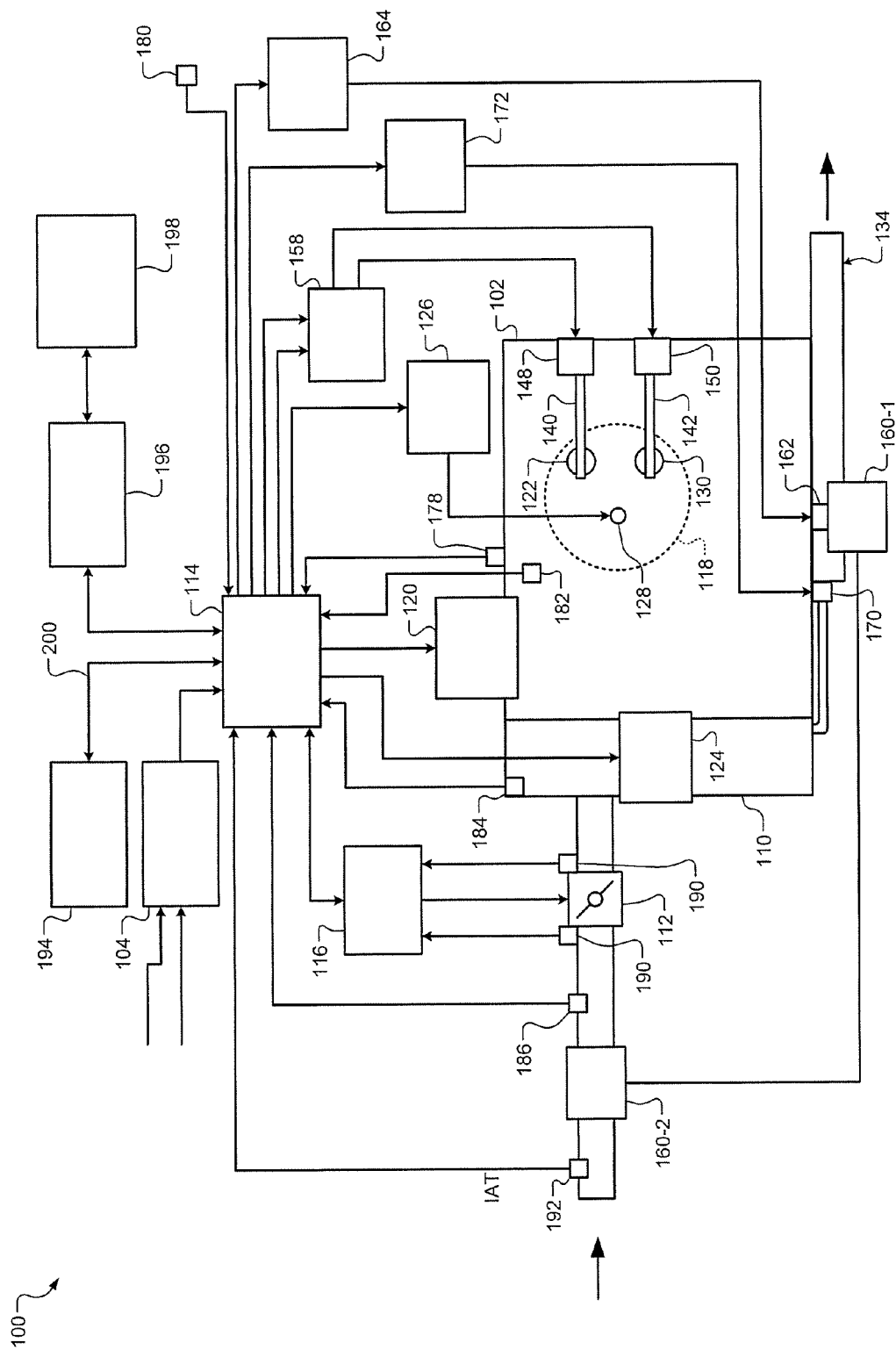
FIG. 1 is a functional block diagram of an engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary engine system 100 is presented. The engine system 100 includes an engine 102 that combusts an air/fuel mixture to produce drive torque for a vehicle based on driver input(s) from a driver input module 104. The driver inputs may include, for example, one or more accelerator pedal positions (APPs) measured by APP sensors (not shown), one or more brake pedal positions (BPPs) measured by BPP sensors (not shown), and a cruise torque request provided by a cruise control system (not shown). In various implementations, the cruise control system may include an adaptive cruise control system that maintains a predetermined following distance.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into one or more cylinders of the engine 102. While the engine 102 may include more than one cylinder, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy in some circumstances.

The engine 102 may operate using a four-stroke engine cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions may be necessary for the cylinder 118 to experience all four of the strokes of one engine cycle.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve(s) of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture. During the compression stroke, a piston (not shown) within the cylinder 118 compresses the air/fuel mixture. Based on a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Combustion of the air/fuel mixture within a cylinder may be referred to as a firing event. The spark actuator module 126 may have the ability to vary the timing of the spark for each firing event. In addition, the spark actuator module 126 may have the ability to vary the spark timing for a given firing event even when a change in the timing signal is received after a firing event of a cylinder immediately before a given firing event.

During the combustion stroke, the combustion of the air/fuel mixture drives the piston away from the TDC position, thereby driving the rotation of the crankshaft. The combustion stroke may be defined as the time between the piston reaching TDC and the time at which the piston reaches a bottommost position, which may be referred to as bottom dead center (BDC).

During the exhaust stroke, the piston begins moving toward the TDC position again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to the TDC position by an intake cam phaser 148. The time at which the exhaust valve 130 is opened may be varied with respect to the TDC position by an exhaust cam phaser 150. A phaser actuator module 158 may control the intake cam phaser 148 and the exhaust cam phaser 150 based on signals from the ECM 114. When implemented, variable valve actuation (VVA) technologies (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 (e.g., a turbo bypass valve) may allow exhaust to bypass the turbine 160-1, thereby reducing the boost provided by the turbocharger. The boost may include, for example, the difference between pressure within the intake manifold 110 and pressure within an intake manifold of a naturally aspirated engine under the same operating conditions.

The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other near the location of the turbine 160-1, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbine 160-1. The EGR valve 170 may be controlled by an EGR actuator module 172.

The engine system 100 may measure rotational speed of the crankshaft in revolutions per minute (RPM) using an RPM sensor 178. The engine system 100 may measure speed of the vehicle using a vehicle speed sensor 180. The vehicle speed may be determined based on, for example, a transmission output shaft speed (TOSS), one or more wheel speeds, or another suitable measure of the vehicle speed. Temperature of engine coolant may be measured using an engine coolant temperature (ECT) sensor 182. The ECT sensor 182 may be located within the engine 102 or at other locations where the coolant is circulated, such as a radiator (not shown).

Pressure within the intake manifold 110 may be measured using a manifold absolute pressure (MAP) sensor 184. In various implementations, engine vacuum may be measured, where engine vacuum includes a difference between ambient air pressure and the pressure within the intake manifold 110. Mass air flow rate into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate operation of the engine 102 with a transmission (not shown). For example, the ECM 114 may reduce engine output torque during a gear shift. The engine 102 may output torque to the transmission via a torque transmission device (not shown), such as a torque converter and/or one or more clutches. The transmission control module 194 may also share data with the ECM 114, such as a current gear ratio engaged within the transmission indicated by one or more gear sensors (not shown) and a state of the torque transmission device. For example only, for the case of the torque converter, the state may include a locked state or an unlocked state of a torque converter clutch (TCC) (not shown).

The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

An engine actuator varies one or more engine parameters by controlling an associated actuator value. For example only, the throttle actuator module 116 may be referred to as an engine actuator and the throttle opening area may be referred to as the associated actuator value. In the example of FIG. 1, the throttle actuator module 116 achieves the throttle opening area by adjusting an angle of the blade of the throttle valve 112.

Similarly, the spark actuator module 126 may be referred to as an engine actuator, while the associated actuator value may refer to the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the associated actuator values may include number of activated cylinders, fueling rate, intake and exhaust cam phaser angles, boost pressure, and EGR valve opening area, respectively. The ECM 114 may control actuator values in order to cause the engine 102 to generate a desired engine output torque and achieve desired engine parameters.

Various control modules of the engine system 100 (including, but not limited to, the engine control module 114) may include one or more microprocessors and communicate over a vehicle bus 200. For example, a distributed communications network such as a controller area network (CAN) may facilitate communication between the microprocessors over the vehicle bus 200.

Figure 2:
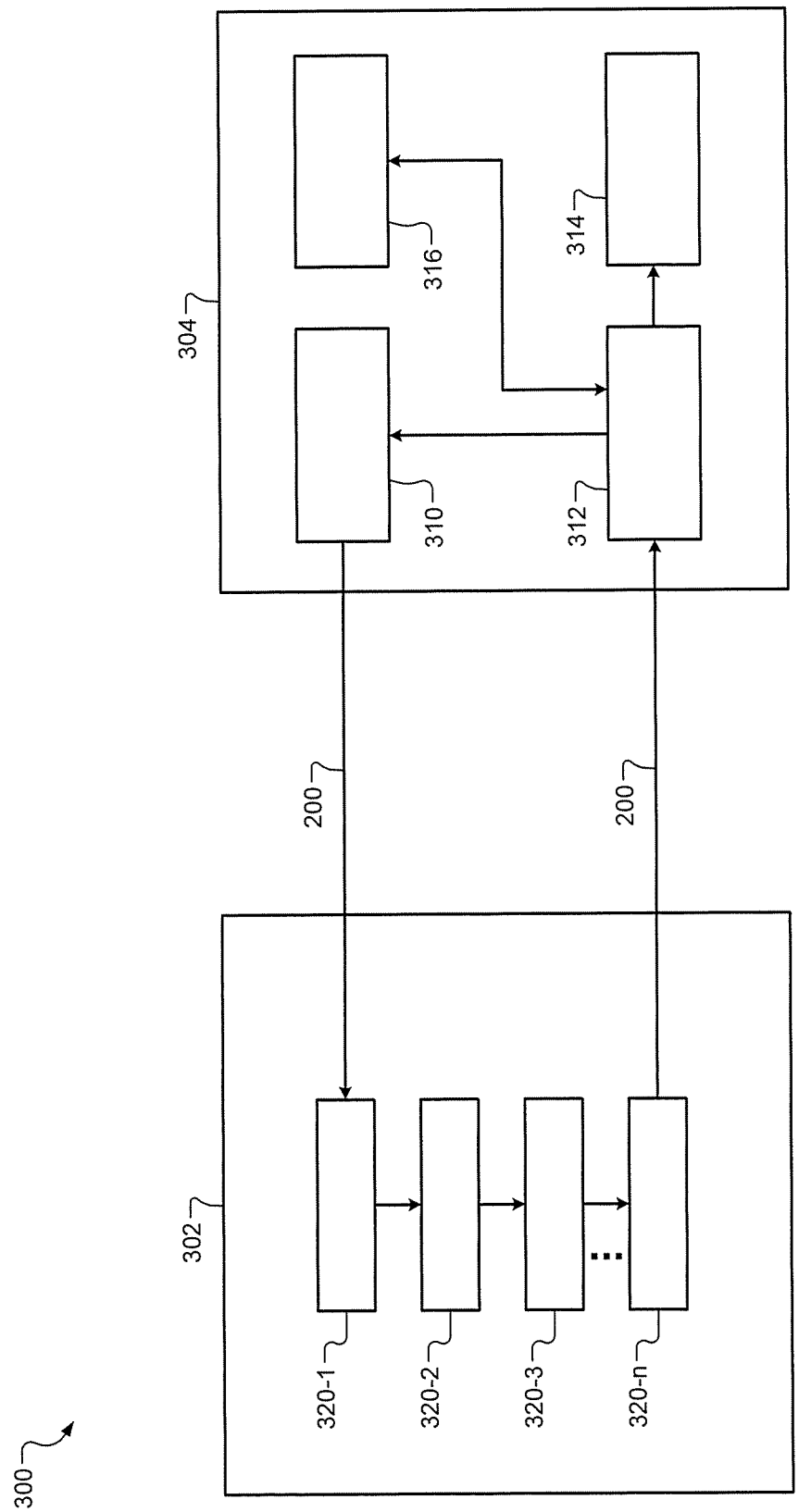
FIG. 2 is a functional block diagram of a first distributed network for a vehicle according to the principles of the present disclosure.

Referring now to FIG. 2, an exemplary distributed network 300 is shown. Although the distributed network 300 is shown to include microprocessor modules 302 and 304, those skilled in the art can appreciate that the distributed network 300 can include any suitable number of microprocessor modules corresponding to control modules of the vehicle. For example only, the microprocessor module 302 (i.e. a main processor module 302) may correspond to the engine control module 114. The microprocessor module 304 (i.e. a monitoring processor module 304) may be a high integrity independent microprocessor external to the engine control module 114 that monitors the main processor module 302 and other vehicle microprocessors over the distributed network 300. For example only, the monitoring processor module 304 may be associated with the transmission control module 194 or another vehicle module. In other words, the monitoring processor module 304 is not a dedicated processor for monitoring the main processor module 302. The monitoring processor module 304 may itself be monitored (e.g. by onboard monitor hardware) to ensure its own integrity.

The monitoring processor module 304 may periodically and/or conditionally challenge the integrity of the main processor module 302. For example, the monitoring processor module 304 may query the main processor module 302 and verify a response received from the main processor module 302 (e.g. using a seed/key exchange). The monitoring processor module 304 determines whether the main processor module 302 is functioning properly based on the response. The monitoring processor module 304 may initiate remedial actions if the main processor module 302 is not functioning properly. For example, the monitoring processor module 304 may indicate that the main processor module 302 is in a failure mode including, but not limited to, fail to execute, incomplete execution, incorrect timing, and/or erroneous execution.

The monitoring processor module 304 includes a query module 310 and a validation module 312. The query module 310 determines a query (e.g. a seed) to transmit to the main processor module 302. For example only, the query may include a 4 bit number between 0 and 15 (i.e. 0000 and 1111) that is transmitted to the main processor module 302 over the bus 200. The monitoring processor module 304 may transmit a plurality (e.g. 16) of queries sequentially from 0000 to 1111 to the main processor module 302. If instructed (e.g. by the validation module 312), the monitoring processor module 304 may repeat transmission of one of the queries before resuming sequential transmission of the queries.

The validation module 312 receives answers (e.g. keys) to the queries transmitted to the main processor module 302. The validation module 312 may also receive the queries from the main processor module 302. The validation module 312 determines whether the answers to the queries are correct. For example, each query may have a corresponding expected answer. The validation module compares each received answer to the corresponding expected answer based on the query received from the main processor module 302. If the received answer matches the expected answer, the received answer is validated. Accordingly, no remedial action is required because the main processor module 302 is deemed to be functioning properly. Each of the queries 0000 through 1111 may have a unique corresponding answer. For example, each answer may also be a 4 bit number between 0 and 15.

If the received answer does not match the expected answer, the received answer is not validated, and the validation module 312 may instruct the query module 310 to repeat transmission of the corresponding query. If subsequent received answers do not match the expected answer (e.g. if a number of invalid received answers exceeds a threshold in a predetermined period of time), the validation module 312 may request remedial action via a remedial action module 314. The validation module 312 may increment a counter 316 each time the received answer does not match the expected answer and request remedial action when the counter 316 exceeds the threshold. Conversely, the validation module 312 may decrement the counter 316 each time the received answer matches the expected answer.

For example, when the validation module 312 requests remedial action: the remedial action module 314 may direct the monitoring processor module 304 or another module to assume the processing functions of the main processor module 302; the remedial action module 314 may direct the monitoring processor module 304 to ignore inputs received from the main processor module 302 and to inform other modules of the fault status of the main processor module 302; the remedial action module 314 may disable outputs of the main processor module 302; and/or the remedial action module 314 may instruct other modules to ignore inputs received from the main processor module 302.

The validation module 312 may detect other faults that affect answer validation. For example, the validation module 312 may receive an indication of loss of communication on the bus 200 (i.e. a loss of communication fault), communication data faults (e.g. a rolling count error), and/or a "stuck" query fault. A stuck query fault refers to a query value that does not change in consecutive queries over a predetermined period of time. For example, the transmitted query may be stuck at 0000 instead of incrementing sequentially between 0000 and 1111. When no other faults are detected or only a stuck query is detected, an invalid answer indicates that the main processor module 302 is not functioning properly. Conversely, when the only fault is a stuck query fault, the validation module 312 may be unable to diagnose a source of the fault. Loss of communication or communication data faults indicate that the monitoring processor module 304 is no longer able to monitor the main processor module 302.

The main processor module 302 may include function modules 320-1, 320-2, 320-3, . . . , and 320-n, referred to collectively as function modules 320. Each of the function modules 320 may executed a different function of the main processor module 302. For example, each of the function modules 320 may correspond to an application specific function of the vehicle associated with the main processor module 302.

The function module 320-1 receives the query from the monitoring processor module 304 via the bus 200. The function module 320-1 generates a first partial answer based on the query and transmits the query and the first partial answer to the function module 320-2. The function module 320-2 generates a second partial answer based on the query and the first partial answer and transmits the query and the second partial answer to the function module 320-3. The function module 320-3 generates a third partial answer based on the query and the second partial answer and transmits the query and the third partial answer to the function module 320-n. The function module 320-n generates a final answer based on the query and the third partial answer and transmits the query and the third partial answer to the validation module 312 via the bus 200. If any one of the function modules 320 is not functioning properly, the final answer transmitted to the validation module 312 will not match the expected answer. Accordingly, the final answer validates the integrity of each individual function of the main processor module 302 that receives the query and a partial answer.

Figure 3:
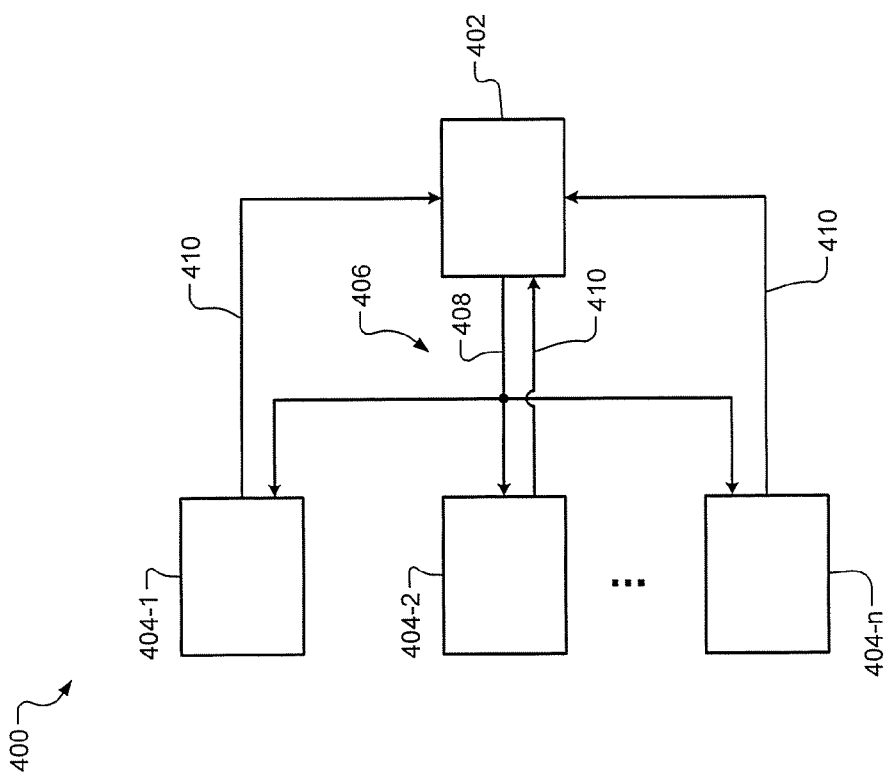
FIG. 3 is a functional block diagram of a second distributed network for a vehicle according to the principles of the present disclosure.

Referring now to FIG. 3, an exemplary distributed network 400 for a vehicle includes a monitoring processor module 402 and main processor modules 404-1, 404-2, . . . , and 404-n, referred to collectively as main processor modules 404. The monitoring processor module 402 communicates with the main processor modules 404 over a vehicle bus 406. In the distributed network 400, the monitoring processor module 402 transmits a single query (i.e. seed) 408 to each of the main processor modules 404. Accordingly, each of the main processor modules 404 receives the same query 408. The main processor modules 404 each transmit an answer (i.e. key) 410 back to the monitoring processor module 402. In this implementation, the expected answer from each of the main processor modules 404 is the same.

Figure 4:
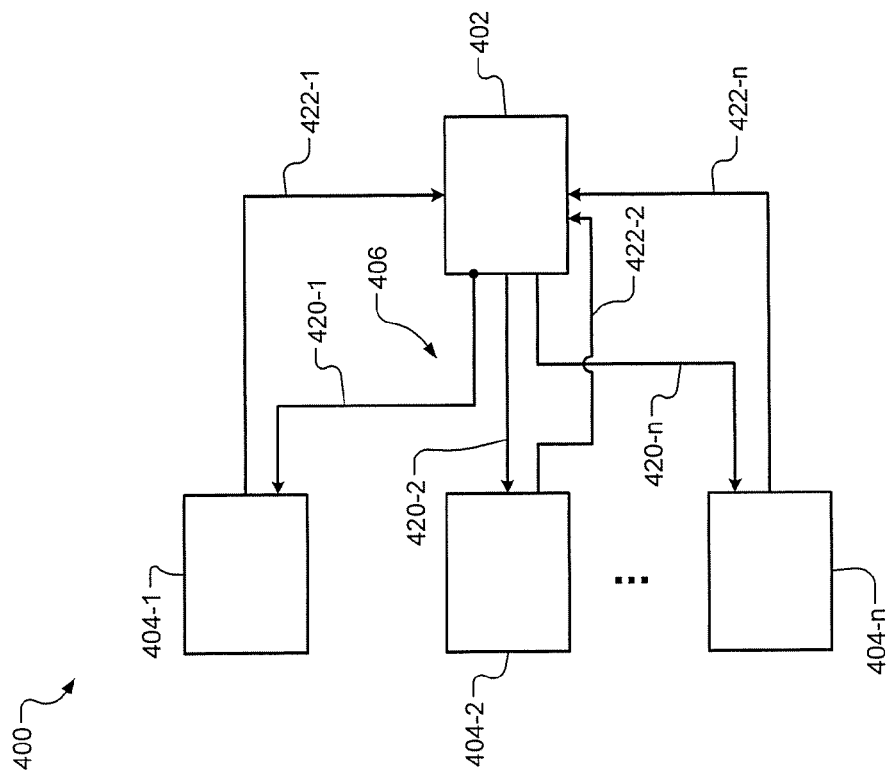
FIG. 4 is a functional block diagram of a third distributed network for a vehicle according to the principles of the present disclosure.

Referring now to FIG. 4, the monitoring processor module 402 transmits queries 420-1, 420-2, . . . , and 420-3, referred to collectively as queries 420, to the main processor modules 404-1, 404-2, . . . , and 404-n, respectively. In other words, each of the main processor modules 404 receives a different query 420. The main processor modules 404 transmit answers 422-1, 422-2, . . . , and 422-n back to the monitoring processor module 402. In this implementation, the expected answers from each of the main processor modules 404 are different.

Figure 5:
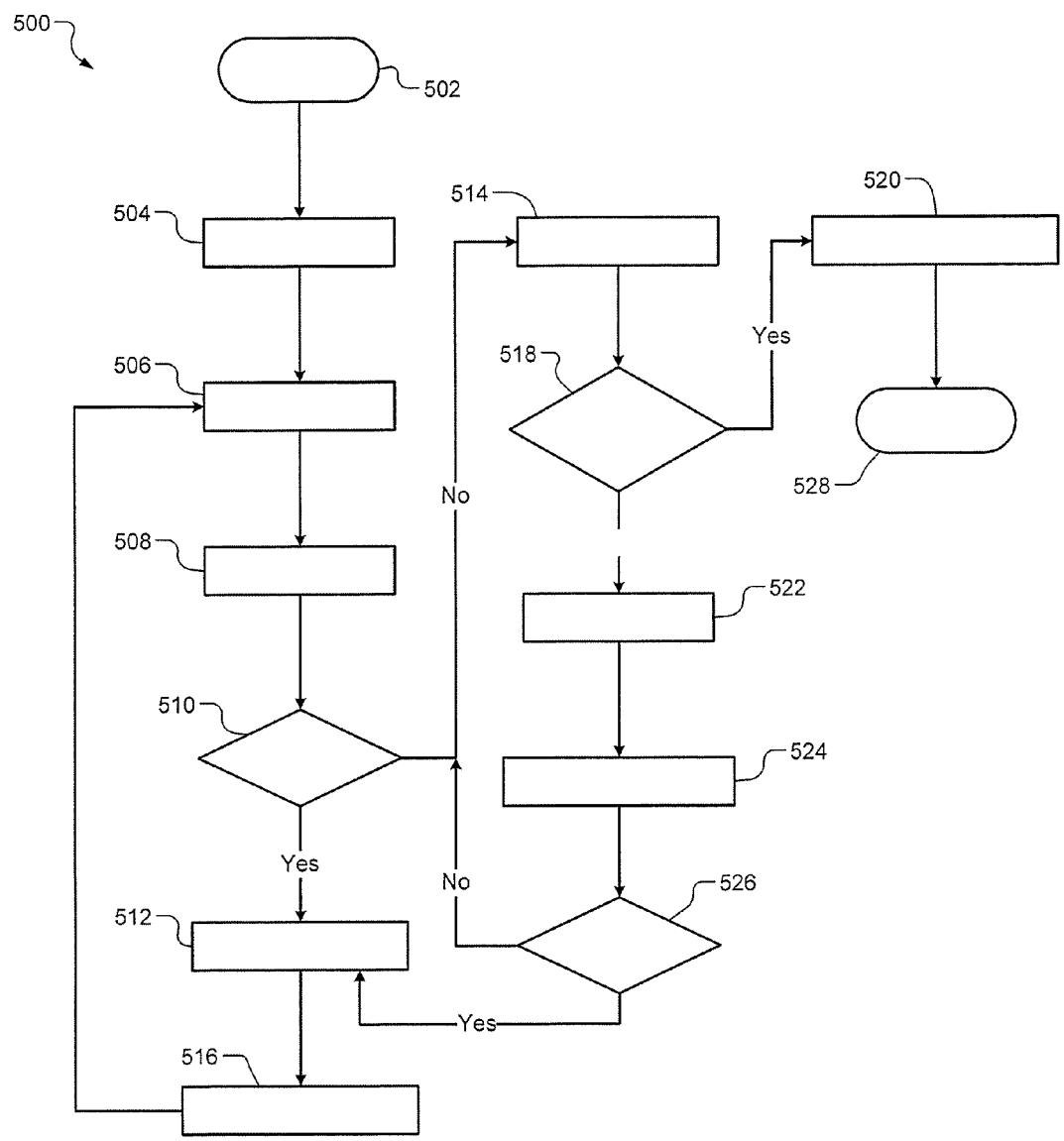
FIG. 5 is a flow diagram illustrating steps of a microprocessor validation method according to the principles of the present disclosure.

Referring now to FIG. 5, a microprocessor validation method 500 begins in step 502. In step 504, the method 500 determines a query to transmit to one or more main processor modules. For example, if the method 500 is transmitting an initial query, the query may be 0000 or another initial sequential value. In step 506, the method 500 transmits the query to one or more main processor modules. In step 508 the one or more main processor modules generate and transmit an answer based on the query. In step 510 the method 500 determines whether the answer matches an expected answer. If true, the method 500 continues to step 512. If false, the method 500 continues to step 514. In step 512, the method 500 decrements a counter. In step 516, the method 500 determines a new query (e.g. increments the query from 0000 to 0001) and returns to step 506.

In step 514 the method 500 increments a counter. In step 518 the method 500 determines whether the counter exceeds a predetermined value. If true, the method 500 continues to step 520. If false, the method 500 continues to step 522. In step 520, the method 500 initiates one or more remedial actions.

In step 522, the method 500 repeats transmission of the query. In step 524, the method 500 receives a new answer based on the query. In step 526, the method 500 determines whether the new answer matches the expected answer. If true, the method 500 continues to step 512. If false, the method continues to step 514. The method terminates in step 528.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A processor integrity system in a vehicle, the system comprising:
   m main processor modules that control at least m respective functions of the vehicle, where m is an integer greater than one; and
   a monitoring processor module that controls at least one function of the vehicle, that communicates with the m main processor modules over a distributed vehicle network, that selectively transmits a first query to at least one of the m main processor modules over the distributed vehicle network, that receives a first answer from at least one of the m main processor modules over the distributed vehicle network, that selectively transmits a second query to at least one of the m main processor modules if the first answer does not match a first expected answer, that receives a second answer from the at least one of the m main processor modules over the distributed vehicle network, and that sends a request for remedial action for at least one of the m main processor modules to a remedial action module if the second answer does not match a second expected answer, wherein the first query and the second query are different and the first expected answer and second expected answer are different.

2. The system of claim 1 wherein the monitoring processor module compares the first answer to the first expected answer to verify the integrity of the at least one of the m main processor modules, and wherein the first expected answer is based on the first query.

3. The system of claim 2 wherein the monitoring processor module increments a counter if either one of the first answer and the second answer does not match the first expected answer or the second expected answer, respectively, and decrements the counter if either one of the first answer and the second answer does match the first expected answer or the second expected answer, respectively.

4. The system of claim 3 wherein the monitoring processor module transmits the second query if the counter does not exceed a predetermined limit and the first answer does not match the first expected answer.

5. The system of claim 4 wherein the monitoring processor module initiates a remedial action if the counter exceeds a predetermined value.

6. The system of claim 1 wherein the monitoring processor module receives the first query and the second query from the at least one of the m main processor modules over the distributed vehicle network.

7. The system of claim 1 wherein the monitoring processor module adjusts the first query after verifying the integrity of the at least one of the m main processor modules.

8. The system of claim 1 wherein the monitoring processor module transmits at least one of the first query and the second query to at least two of the m main processor modules.

9. The system of claim 1 wherein the main processor module transmits a different query to each of the m main processor modules.

10. A processor integrity method in a vehicle, the method comprising:
   controlling at least m respective functions of the vehicle using m respective main processor modules, where m is an integer greater than one;
   controlling at least one function of the vehicle using a monitoring processor module;
   communicating with the m main processor modules over a distributed vehicle network using the monitoring processor module;
   selectively transmitting a first query from the monitoring processor module to at least one of the m main processor modules over the distributed vehicle network;
   receiving a first answer from the at least one of the m main processor modules at the monitoring processor module over the distributed vehicle network;
   comparing the first answer to a first expected answer that is based on the first query to verify the integrity of the at least one of the m main processor modules using the monitoring processor module;
   transmitting a second query to the at least one of the m main processor modules if the first answer does not match the first expected answer, wherein the first query and the second query are different;
   receiving a second answer from the at least one of the m main processor modules over the distributed vehicle network; and
   sending a request for remedial action for the at least one of the m main processor modules to a remedial action module if the second answer does not match a second expected answer, wherein the first expected answer and the second expected answer are different.

11. The method of claim 10 further comprising incrementing a counter using the monitoring processor module if either one of the first answer and the second answer does not match the first expected answer or the second expected answer, respectively, and decrementing the counter using the monitoring processor module if either one of the first answer and the second answer does match the first expected answer or the second expected answer, respectively.

12. The method of claim 11 further comprising transmitting the second query if the counter does not exceed a predetermined limit and if the first answer does not match the first expected answer.

13. The method of claim 12 further comprising initiating a remedial action using the monitoring processor module if the counter exceeds a predetermined value.

14. The method of claim 10 further comprising receiving the first query and the second query at the monitoring processor module from the at least one of the m main processor modules over the distributed vehicle network.

15. The method of claim 10 further comprising adjusting the first query using the monitoring processor module after verifying the integrity of the at least one of the m main processor modules.

16. The method of claim 10 further comprising transmitting at least one of the first query and the second query to at least two of the m main processor modules using monitoring processor module.

17. The method of claim 10 further comprising transmitting a different query to each of the m main processor modules using the main processor module.

* * * * *